US012244723B2

(12) United States Patent
Irazábal et al.

(10) Patent No.: US 12,244,723 B2
(45) Date of Patent: Mar. 4, 2025

(54) SYSTEM AND METHOD TO CRYPTOGRAPHICALLY VALIDATE RICH QUERY RESULTS

(71) Applicant: Codenotary Inc., Bellaire, TX (US)

(72) Inventors: Jerónimo Irazábal, Buenos Aires (AR); Moshe Bar, Houston, TX (US); Dennis Zimmer, Kuessnacht am Rigi (CH); Stefano Scafiti, Aci Catena (IT)

(73) Assignee: Codenotary Inc., Bellaire, TX (US)

( * ) Notice: Subject to any disclaimer, the term of this patent is extended or adjusted under 35 U.S.C. 154(b) by 209 days.

(21) Appl. No.: 17/745,603

(22) Filed: May 16, 2022

(65) Prior Publication Data

US 2022/0368533 A1 Nov. 17, 2022

Related U.S. Application Data

(60) Provisional application No. 63/189,198, filed on May 16, 2021.

(51) Int. Cl.
*H04L 9/32* (2006.01)
*G06F 16/2455* (2019.01)

(52) U.S. Cl.
CPC ........ *H04L 9/3236* (2013.01); *G06F 16/2455* (2019.01)

(58) Field of Classification Search
CPC ..... H04L 9/00; H04L 9/06; H04L 9/08; H04L 9/32; H04L 9/50; H04L 9/0894; H04L 9/3213; H04L 9/3236; H04L 9/3242; H04L 9/3247; G06F 16/22; G06F 16/137; G06F 16/152; G06F 16/2246; G06F 16/2255; G06F 16/2455; G06F 21/602; G06F 21/645; G06F 21/6218; G06F 21/6227; G06F 12/1408
USPC ........................................................ 713/168
See application file for complete search history.

(56) References Cited

U.S. PATENT DOCUMENTS

| | | | | |
|---|---|---|---|---|
| 5,072,378 A | * | 12/1991 | Manka | G11B 20/1252 |
| 10,255,454 B2 | * | 4/2019 | Kamara | H04L 9/008 |
| 2016/0365978 A1 | * | 12/2016 | Ganesan | G06F 16/2255 |
| 2016/0379013 A1 | * | 12/2016 | Ganesan | G06F 21/645 |
| | | | | 713/176 |

(Continued)

OTHER PUBLICATIONS

Yuan X, Wang X, Wang C, Qian C, Lin J. Building an encrypted, distributed, and searchable key-value store. InProceedings of the 11th ACM on Asia Conference on Computer and Communications Security May 3, 20160 (pp. 547-558). (Year: 2016).*

(Continued)

*Primary Examiner* — James N Fiorillo
(74) *Attorney, Agent, or Firm* — J. Roger Williams, Jr.

(57) ABSTRACT

Disclosed are a computer-hosted database system providing cryptographic verifiability and comprising an immutable key-value data store and cryptographic proof data (which may be stored in a Merkle Hash Tree). The logical structure of a data record is defined by a rich data model and comprises a first field and a second field. Disclosed is a method that comprises receiving an instruction requesting retrieval of first field data and returning the data stored in the first field and cryptographic proof data sufficient to prove data originality of the first field data without knowledge of the data in the second field. The rich data model may be a relational data model or a document data model.

18 Claims, 11 Drawing Sheets

(56) References Cited

U.S. PATENT DOCUMENTS

| | | | |
|---|---|---|---|
| 2017/0024657 A1* | 1/2017 | Sahu | G06N 5/022 |
| 2018/0247296 A1* | 8/2018 | Win | G06Q 30/0207 |
| 2018/0294952 A1* | 10/2018 | Yuan | H04L 9/3213 |
| 2019/0179948 A1* | 6/2019 | Benjamin-Deckert | G06F 16/3332 |
| 2020/0320068 A1* | 10/2020 | Malak | G06F 16/26 |
| 2021/0056095 A1* | 2/2021 | Srivastava | G06F 16/2379 |
| 2021/0110049 A1* | 4/2021 | Kumar | H04L 9/0825 |
| 2021/0182423 A1* | 6/2021 | Padmanabhan | H04L 9/3271 |
| 2021/0279205 A1* | 9/2021 | Irazabal | G06F 16/152 |
| 2021/0377037 A1* | 12/2021 | Antonopoulos | H04L 9/3247 |

OTHER PUBLICATIONS

Cash D, Jaeger J, Jarecki S, Jutla C, Krawczyk H, Rou MC, Steiner M. Dynamic searchable encryption in very-large databases: Data structures and implementation. Cryptology ePrint Archive. 2014. (Year: 2014).*

* cited by examiner

≈ 1100

```
TABLE acm_vsphere_cookedEvent (
    vcenter_instanceUuid VARCHAR[36],
    eventKey INTEGER,
    eventType VARCHAR,
    affected_objectName VARCHAR,
    affected_mold VARCHAR[50],
    userName VARCHAR,
    fullFormattedMessage VARCHAR,
    computeResource_name VARCHAR,
    computeResource_mold VARCHAR[50],
    datacenter_name VARCHAR,
    datacenter_mold VARCHAR[50],
    host_name VARCHAR,
    host_mold VARCHAR[50],
    datastore_name VARCHAR,
    datastore_mold VARCHAR[50],
    vm_name VARCHAR,
    vm_mold VARCHAR[50],
    sourceDatacenter_name VARCHAR,
    sourceDatacenter_mold VARCHAR[50],
    sourceHost_name VARCHAR,
    sourceHost_mold VARCHAR[50],
    sourceDatastore_name VARCHAR,
    sourceDatastore_mold VARCHAR[50],
    net_name VARCHAR,
    migration_direction VARCHAR,
    createdTime TIMESTAMP,
    PRIMARY KEY (vcenter_instanceUuid, eventKey)
);
```

FIG. 11

```
                                                            ┌─1200
SELECT vcenter_instanceUuid, fullFormattedMessage, vm_moId
FROM acm_vsphere_cookedEvent
WHERE eventType='VmClonedEvent' AND createdTime = '2022-05-01';
```

FIG. 12

```
                                                            ┌─1300
[
 {
   vcenter_instanceUuid: "bb21f5a2-c243-4912-ba6e-45861f7921f8",
   fullFormattedMessage: "vm_template cloned to VM_1 on host_1, in Datacenter",
   vm_moId: "vm-1301"
 }
]
```

FIG. 13

```
                                                                    ┌─1400
[
 {
  row: {
    vcenter_instanceUuid: "bb21f5a2-c243-4912-ba6e-45861f7921f8",      ┌─1440
    fullFormattedMessage: "vm_template cloned to VM_1 on host_1, in Datacenter",
    vm_moId: "vm-1301",
                                                                        ┌─1410
  },
  tx_header: information about the tx i.e unique identifier, previous_hash, number of entries,
  entries_hash...,
                                                                        ┌─1420
  values_inclusion_proof: hash values used to calculate row hash (entry hash) from valued
  columns,                                                              ┌─1430
  row_inclusion_proof: hash values used to calculate entries_hash from row hash (entry hash),
 }
]
```

FIG. 14

SYSTEM AND METHOD TO CRYPTOGRAPHICALLY VALIDATE RICH QUERY RESULTS

CROSS-REFERENCE TO RELATED APPLICATIONS

This application claims the benefit of U.S. Provisional Application No. 63/189,198, filed on May 16, 2021, the contents of which are incorporated in their entirety.

FIELD OF THE INVENTION

The present disclosure pertains to the storage of data, specifically immutable and cryptographically verifiable data storage in a rich data model such as a document model or a relational model.

BACKGROUND OF THE INVENTION

The key-value data model is a simple yet powerful data model used as the basis for the construction of complex storage systems. While a key-value model can be used as a primary storage system, the simplicity of the model creates challenges at the application level, and richer data models at a higher level of abstraction are commonly used for application development. Two common data models for application development are a document model and a relational model. In a document-oriented data model, the central data container entity is a document having one or multiple attributes or properties not necessarily adhering to a standard schema. By using this data model it is possible to store and retrieve such entities using unique identifiers or by evaluating a given condition over the values associated to its properties. Many NoSQL databases use a document data model. The other and perhaps more widely used data model is the relational data model, in which all data is represented as an n-ary relation, customarily represented as a table with n-tuples or rows (rows) and columns (or attributes), and tables may be interrelated, providing rich querying capabilities that leverage relationships among tables and values on individual columns. Expressive languages such as SQL can leverage the relational data model. The term "rich query" reflects the use of a query language (such as SQL).

Regardless of the data model exposed by the storage system, the underlying data model may consist of a simple key-value data model. Consider, for example, the exemplary data models shown in FIG. 1. Data model 110 is an exemplary simple relational data model where column PK includes the primary key values for each data record and columns A, B, and C include the other data values. Data model 110 can be mapped to an exemplary key-value data store 120 wherein the primary PK column entry in each row is the key of a key-value record, and the value includes the primary key entry plus all data in each column of the record. For example, record 111 in table 110 can be mapped to key-value pair 121 where the primary key value 112 for record 111, $pk_1$, is the key 122 for key-value pair 121, and the value 123 of key-value record 121 includes the data values $pk_1$, $a_1$, $b_1$, and $c_1$ from data record 111. An exemplary SQL command 115 can be used to query table 110 to generate a result set 130 containing the data values for Columns A and C only. Similarly, the key-value data store 120 can be scanned 125 to generate the same result set 130 containing the data values for Columns A and C only. FIG. 1 illustrates that an SQL query can be transformed into a query on a key-value data store and how a subset of the column data (as opposed to the entire data record) can be returned in response to a query.

Applicant's Immudb™ open source immutable database is an example of an immutable key-value store. This type of storage system is able to store data as key-value pairs and to provide cryptographic proofs demonstrating data originality, meaning that the data remains as originally stored, i.e., entries are not updated or deleted, at least without leaving a proper trace of it. The immudb database system achieves this property by supporting the storage layer with a Mutable Merkle Hash Tree (MHT).

An embodiment of a Merkle Tree or Merkle Hash Tree (WIT) is illustrated in FIG. 5. Originally conceived by Ralph C. Merkle, these trees were conceived as digital signatures, attested to in a public shared file, to some underlying data. The primary motivation of the signature scheme at the time was to provide cryptographically secure signatures under certain circumstances while avoiding the computational expense (significant at the time) of using asymmetric key encryption by using computationally cheap hash functions instead. An embodiment of the operation of these trees is as follows: 1. Some n data elements $x_0$ through $x_n$ are presented for signature. In Merkle's original conception, these are groups of message bits. For simplicity it may be assumed that n mod 2=0.2. Each of these n elements is digested using a hash function H, and we refer to each $H(x_i)$, $0<i<n$ as $X_i$ for notational convenience. These $X_i$ values form the leaves of the MHT, each $X_i$ contained in a leaf node $I_{i,0}$ denoting its index i and its depth at the leaf layer, 0. More generally, for each node $I_{i,j}$, i is the index of the leftmost element in the subtree rooted at $I_{i,j}$, and j is the node's depth measured in path traversals up (i.e. toward the root) from the leaf layer. 3. Assuming a binary tree, each pair of hashes at the leaf layer are concatenated and hashed, so $I_{0,1}=H(I_{0,0}\|I_{1,0})$. We thus assemble $I_{0,1}, I_{2,1}, \ldots I_{n-1,1}$ into n/2 trees, each of which is a hash of the concatenation of the hashes of two original elements. We repeat this process $I_{0,2}=H(I_{0,1}\|I_{2,1})$ and so on until we create a single tree with root node $I_{0,\log_2 n}$.

The resultant tree has several properties that will prove to be important. First, the root node $I_{0,\log_2 n}$ is a digest of the entire tree, including all of the original data elements $x_0 \ldots x_n$. Thus the alteration of any data element will alter the values at the roots of any subtree containing that value, including the overall tree. Second, the path from the root to any given leaf $I_{i,0}$ is unique. Third, given a data element $x_i$, and a tree root value, it is possible to construct a proof that $x_i$ is in the tree using a series of interior node values.

FIG. 5 illustrates an embodiment of an exemplary Merkle Hash Tree. Each data element $x_i$ is hashed and put into leaf node $I_{i,0}=H(x_i)$. Each pair $I_{i,0}, I_{i+1,0}$ is concatenated, hashed, and placed in interior tree node $I_{i,1}$. Each successive interior tree node consists of the hash of the left-to-right concatenation of the value of its children until a single root node $I_{0,d}, d=\log_2 n$ is created, representing a digest of the entire tree's state.

FIG. 6 illustrates an exemplary inclusion proof for some tree with root $I_{0,2}$ and data element $x_i$. The dashed circle indicates a derivable value; heavy circles (62, 63, 64) are the values that must be provided to prove that $x_i$ as used in the construction of the tree (specifically as the ith element).

The value of an MHT's root is the hash of the left-to-right concatenation of its children's values, and each of its children's values are the left-to-right concatenation of their children's, and so forth. In the case of a complete binary tree with depth 3 and 4 data elements, if we wish to prove the inclusion of $x_1$ we need to provide the missing information to allow someone to generate $I_{0,2}$ given $x_1$.

$$I_{0,2} = H(I_{0,1} \| I_{2,1}) \quad (1)$$
$$= H(H(I_{0,0}) \| I_{1,0}) \| I_{2,1})$$
$$= H(H(I_{0,0}) \| H(x_1) \| I_{2,1})$$

The elements needed to show that $I_{0,1}$ (and by extension $x_1$) was used at its indicated position to generate the tree rooted at $I_{0,2}$ are thus sibling $I_{0,0}$, its parent's sibling $I_{2,1}$, and the root. Thus the inclusion proof is the set $\{I_{0,0}; I_{2,1}; I_{0,2}\}$. More generally, for a given $x_i$, the inclusion proof set is its sibling and the sibling of each parent moving towards the root, which suffice to calculate the root from $x_i$. Proof validation is merely the calculation of the analog to Equation (1) above. This demonstrates an additional important property of the tree—inclusion proofs do not need to contain any data elements, preserving privacy of those data.

The introduction of growing MHTs also introduces a new class of incremental consistency proofs that demonstrate that some tree root value $I_q$ is a digest of a tree built from a valid superset of some other tree whose digest is $I_p$. That is, $I_q$ contains $I_p$ plus additional data elements. Such a proof consists of the interior values in $I_p$ nearest the root that also exist in $I_q$ sufficient to calculate $I_p$, as seen in FIG. 7.

FIG. 7 illustrates how, in an embodiment, the one-element tree at the left can be proved to be consistent with the tree on the right by providing the minimal set of leaves and nodes that proves the left tree can be calculated from the right ($I_{0,0}$ in this case, which can be used to calculate $I_{0,1}$, which is different from $I'_{0,1}$), plus $I_{1,0}$ which can be used to calculate $I'_{0,1}$, and $I_{2,1}$ which, with the computed $I'_{0,1}$, can be used to calculate the root of the right tree. The necessary nodes are in heavy circles (76, 77, 78).

With the improvements described herein, it is possible to produce to a client an inclusion proof for arbitrary entries and general consistency proofs, i.e., that no previous value has been modified since the last time the client performed operations.

BRIEF SUMMARY

Disclosed are a computer-hosted database system providing cryptographic verifiability and a method of managing data in the computer-hosted database system. The computer-hosted database system comprises an immutable key-value data store, one or more data records, and cryptographic proof data associated with the one or more data records, where the data in a data record is stored as one or more key-value entries in the immutable key-value data store, and the logical structure of a data record is defined by a rich data model and comprises two or more data fields, including a first field and a second field. A first data record in the computer-hosted database system includes first transaction data stored in the first field and second transaction data stored in the second field. The method comprises receiving a data retrieval instruction requesting retrieval of data stored in the first field but not data stored in the second field; and returning the first transaction data stored in the first field and first cryptographic proof data sufficient to prove data originality of the first transaction data stored in the first field without knowledge of the second transaction data stored in the second field. In an embodiment, the computer-hosted data system further comprises a Merkle hash tree comprising cryptographic proof data.

In embodiments, the rich data model is a relational data model, in which a data record is a table and a field is a column, and in another embodiment, the rich data model is a document data model, in which the data record is a document and the field is an attribute.

FIGURES

The description below may refer to the following drawings, wherein like numerals refer to like elements, and wherein:

FIG. 11 illustrates an exemplary Table definition in an embodiment of an auditable change management system.

FIG. 12 illustrates an exemplary query in an embodiment of an auditable change management system.

FIG. 13 illustrates an exemplary query result in an embodiment of an auditable change management system.

FIG. 14 illustrates another exemplary query result in an embodiment of an auditable change management system.

DETAILED DESCRIPTION

Figure 1:
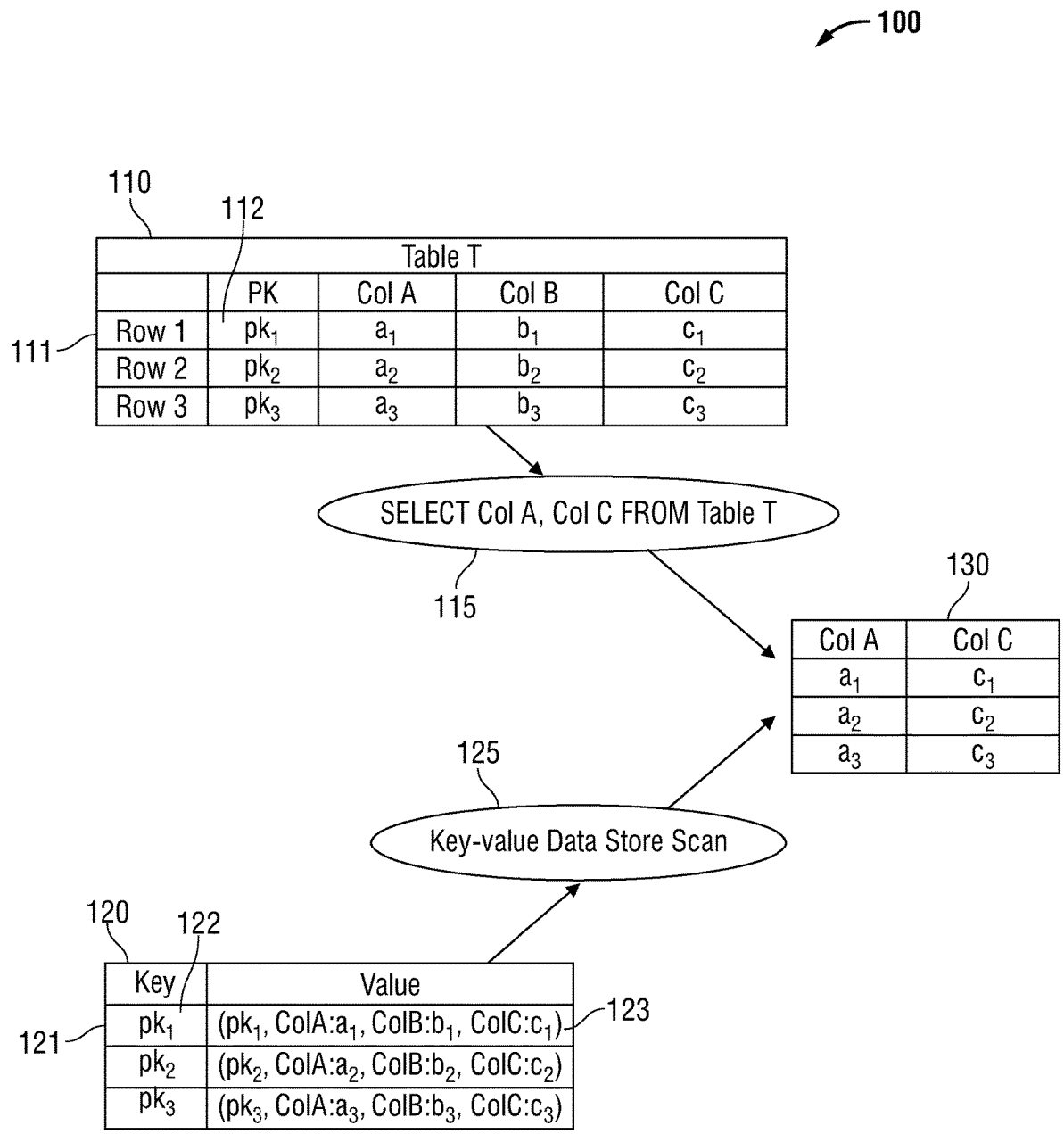
FIG. 1 illustrates an exemplary relational data model implemented with key-value pairs.

Described herein are embodiments of solutions to problems that arise when complex data models are mapped into an immutable key-value model. For example, consider using a key-value data store to implement a complex (or rich) data model with multiple fields, e.g., columns or attributes, for each data record, i.e., table or document. In some situations, only some of the data is of interest. For example, the client may be interested in validating data entries for only a subset of the columns (or attributes) stored in the dataset. There is a need for an implementation that preserves data immutability and can produce cryptographic proofs demonstrating data originality at the column or attribute level, so that cryptographic proofs can be validated without the need of a complete copy of all data in each record.

For sake of simplicity, the exemplary solutions are described in the context of a relational data model that has been implemented in an immutable key-value model. The document-oriented model describes entities with attributes, which in some aspects can be considered to be analogous to columns in a relational table, and the same principles will apply when implementing a document data model with an immutable key-value model.

The relational data model consists of interrelated tables. Each table may have one or several columns (or attributes), providing a clean manner of splitting data for querying and defining relationships. In an embodiment, a column of data contains a data element designated as the primary key, meaning each row has a data value that uniquely identifies that row, or record, of data as part of the table.

In an embodiment, a mapping to key-value pairs is defined for each table in the relational data base. How table records are finally stored as key-value entries is defined by the mapping. For example, a mapping can be catalogued as row-oriented storage (the entire row data associated to one key-value entry) or column-oriented storage (the row data may be stored in multiple key-value entries, one per column).

In an example, each table row is mapped to a single key-value entry based on its primary key. For example, here is row i of an exemplary table in a relational database, where Column 1 contains the primary key value:

| Col. 1 - Key | Col. 2 - Name | ... | Col. N |
|---|---|---|---|
| i | $val_1$ | $val_2$ | ... | $val_N$ |

Row i can be mapped to the following key value entry:
(key=$col_1$:$val_1$, value=[$col_1$:$val_1$, $col_2$:$val_2$, ..., $col_N$:$col_N$])

In an embodiment, the key associated to a row may include the value assigned to the primary key prefixed with the table ID or database and table IDs.

In an embodiment, each $col_x$:$val_x$ entry in the key-value pair includes column-identifying data (Column ID) values, e.g. "col2":val2, or "name":val2. It may be the case that a row does not specify a value for every column defined in the table.

Additional indexes can be defined by generating entries associating the indexed column to the value. With the additional index, it is also possible to retrieve the value data from row i by using the value associated with $col_2$. For example, an index on $col_2$ would result in the following entry for a row containing $val_2$ in such column:
(key=$col_2$:$val_2$, value=$col_1$:$val_1$)
Or, alternatively,
(key=$col_2$:$val_2$:$col_1$:$val_1$, value=<any value>)

The description above conceptually describes an embodiment of how rows of a table can be mapped into a list of key-value entries. Other embodiments are possible and within the scope of the invention. In an embodiment, a row may not contain a value for each declared column in the table, and/or a null value could be explicitly or implicitly stored in the value data for each undefined column entry in the table record. In an embodiment, the value associated with a key may be a pointer or index into a different key-value datastore, in which values are stored.

Figure 3:
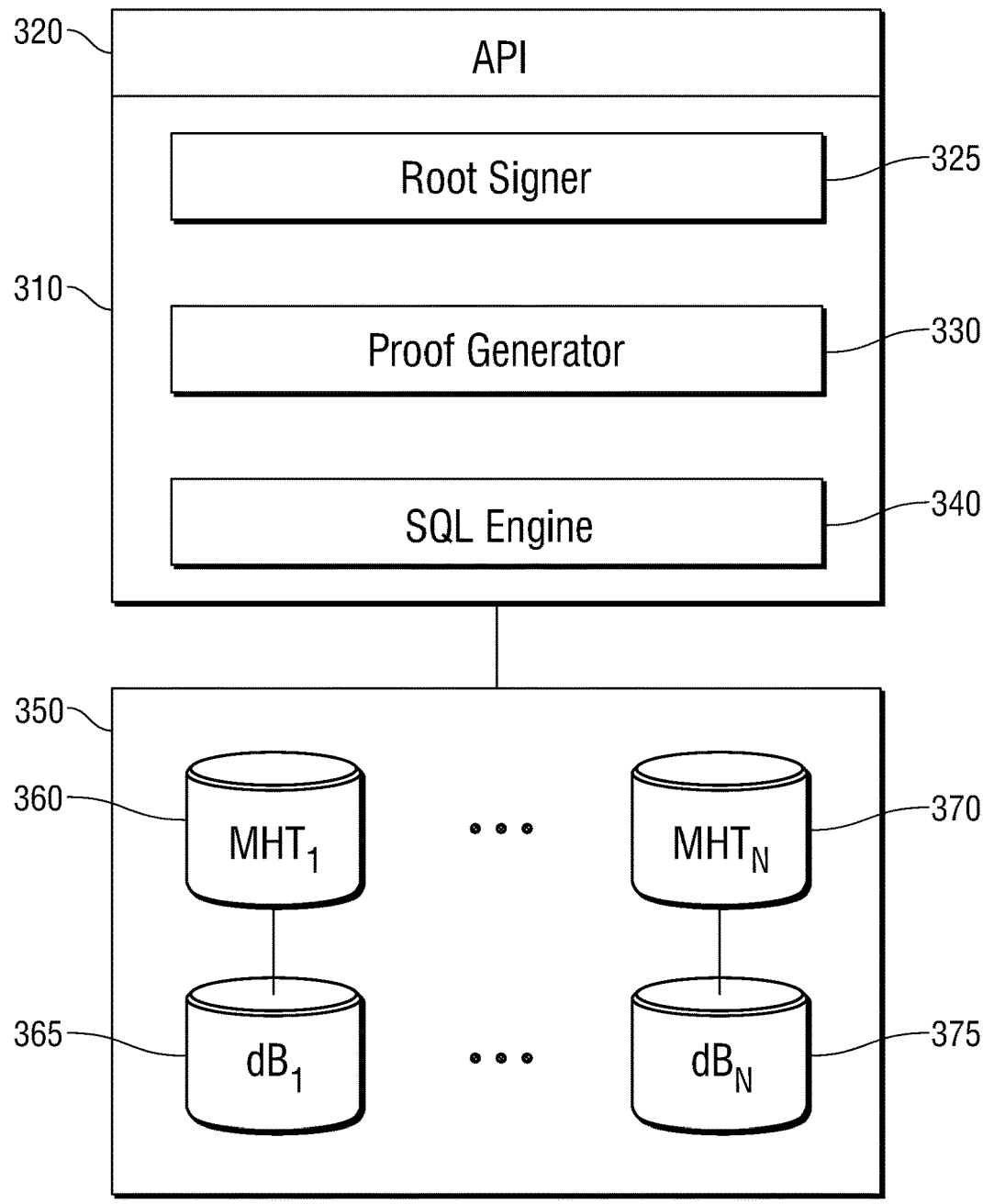
FIG. 3 illustrates an exemplary system environment.

In an embodiment, the environment of this invention includes a client/server model wherein the server stores an authoritative copy of a data store, which in an embodiment concludes a key-value store and a Merkle Hash Tree. FIG. 3 illustrates an exemplary environment 300 containing a server 310 and storage layer 350. Server 310 and/or storage layer 350 may be located on-site or stored remotely, including in the "cloud." Server 310 includes an API 320 for communicating with clients and third-party auditors locally or through an internet, cloud, or networked connection. In an embodiment, server 310 contains software module 325 to generate signed root hashes, software module 330 to generate cryptographic proof data, and SQL Engine 340. Storage layer 350 includes data stores 365, 375, which in an embodiment are key-value data stores, and one or more Merkle Hash Trees 360, 370 associated with (or logically coupled with) each data store. In an embodiment, an immutable key-value data store comprises an associated (or logically coupled) MHT. In an embodiment, an MHT is stored with its associated key-value data store; and in an alternative embodiment, an MHT is stored separately from its associated key-value data store. One or more clients (or client applications) may submit data for storage to the data store and request a cryptographic proof that their data was successfully inserted. One or more auditors (or validators) periodically test the consistency of the MHT by demanding cryptographic proofs.

In an embodiment, the relational database is a relational database. SQL Engine 340 is able to interpret SQL statements and convert the SQL statements into actions or queries to the underlying immutable key-value store. SQL Engine 340 executes client commands to define and create tables with specified parameters (for example, whether the table will be row-oriented or column oriented) and creates an immutable key-value database with those parameters. In an embodiment, the catalog or description of databases and tables, and definitions of columns and types, may be stored in the same immutable key-value data store where row data is stored or into a different key-value store.

One of the advantages of a rich data model is the power to retrieve and update data with granularity at the column or attribute level. For example, as illustrated in FIG. 1, a client may wish to retrieve only the data in columns 1 and 3 in a relational database. As described above, it is possible to map tabular records from a relational database to key-value pairs. However, it is technologically difficult if not impossible with known methods to produce a cryptographic proof at the same level of granularity (columnar or attribute) supported by the tabular structure in the rich data model.

For example, an exemplary method of generating cryptographic proofs includes calculating the hash of the entire value associated to a key, so the hash used to build hash trees for the mapped row would be calculated as hash(value=[$col_1$:$val_1$, $col_2$:$val_2$, ..., $col_N$:$val_N$]), considering value as an array of bytes.

While this approach works when all contents of the value entry are known to the validator of the proof, in the context of the relational data model it may impose limitations. Queries over a table may not return the values of all the columns defined for the table. Thus, the data actually received by the validator may not be the entire value associated with a key. Without a complete set of the row entries for all columns in the table, it would not be possible to perform a cryptographic proof when the hash of the value is calculated as described above. The client would not be able to generate a hash for the entire value entry.

Embodiments of a solution that enable the generation and validation of cryptographic proofs when the validator of the proof does not have the entire data associated with the entry include calculating the hash of the value by building a cryptographic data structure, for example, a hash tree, over the contents of the value entry.

An improved method for generating cryptographic proofs and for storing and retrieving data to support cryptographic proofs includes, in an embodiment, extending an underlying immutable key-value store to receive an already split value, i.e. a list of values, or in more general terms, instructions on how to split the value data into two or more parts. In an embodiment, each split receives a unique label or identifier. In the context of mapping columns within a table, the labels may correspond column IDs. In the context of mapping attributes of a document, the labels may correspond to attributes.

In an embodiment the table components may be mapped to labels dynamically based on, for example, the specific columns identified in a query.

In an embodiment, once the value is split, the hash of the value will be the root of the hash tree generated from the split values. For example, if value=[$val_1, \ldots, val_n$] the hash of the value would be rootHash($split_1, split_2, \ldots, split_n$), where $split_j$ corresponds to $val_j$.

In an embodiment where labels correspond to column names, the root hash computed on the value is the root of the hash tree where each leaf is a pair of the form (col: hash(val)). In an embodiment the col value is or is based on the column ID. By constructing the hash tree for the row taking into account the column IDs it is possible to validate it and to check that a row defines a unique value for each column. With this approach it is possible to validate provided or retrieved values, non-duplication of columns, and unset columns. The validator preferably has the list of columns and the hash of all split values to recalculate the root hash of the row (or value entry) but, in an embodiment, does not receive the actual values of non-returned columns as part of a query result.

Figure 2:
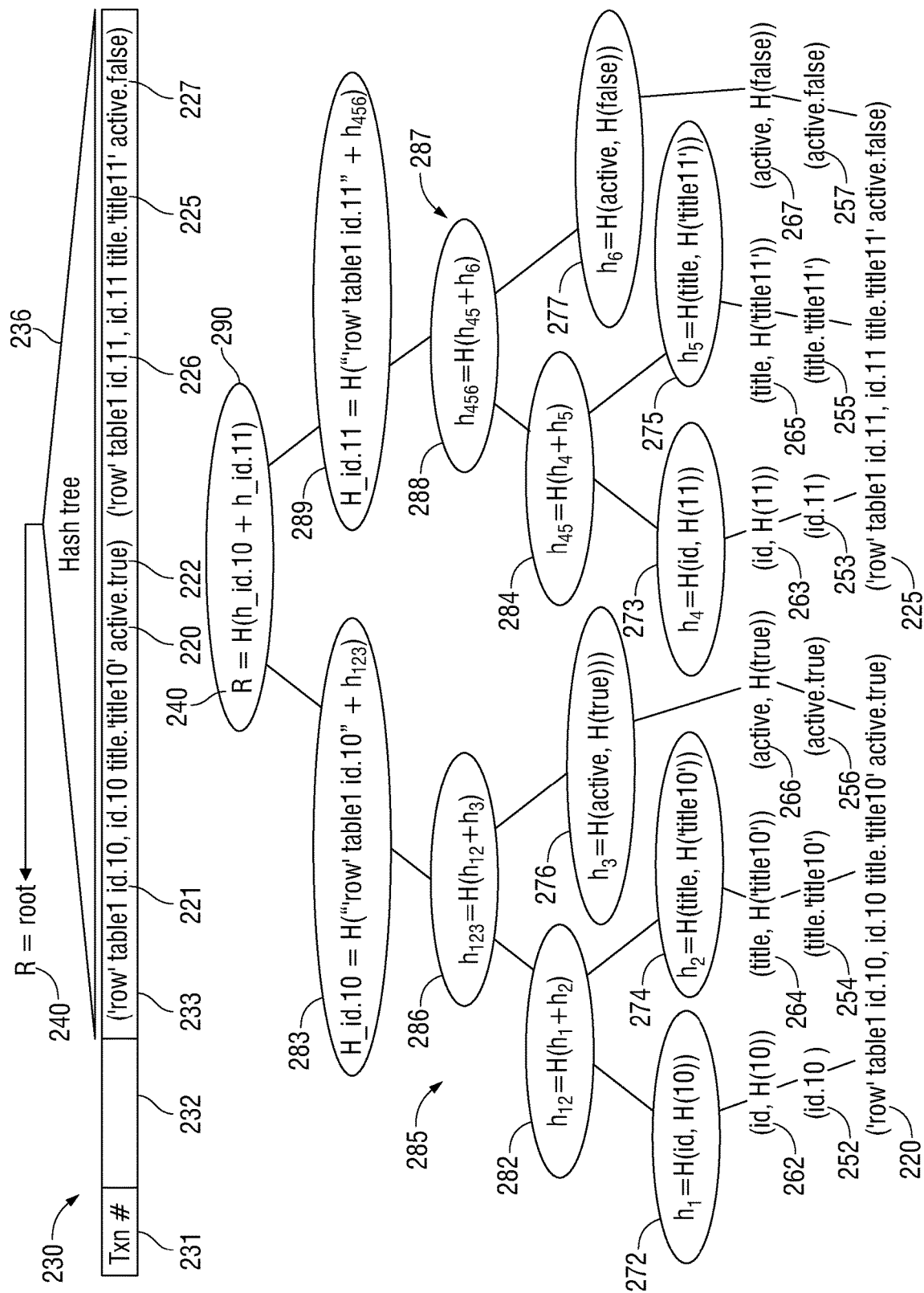
FIG. 2 illustrates an exemplary method of constructing a root hash for a transaction containing one or more rows.
Figure 4A:
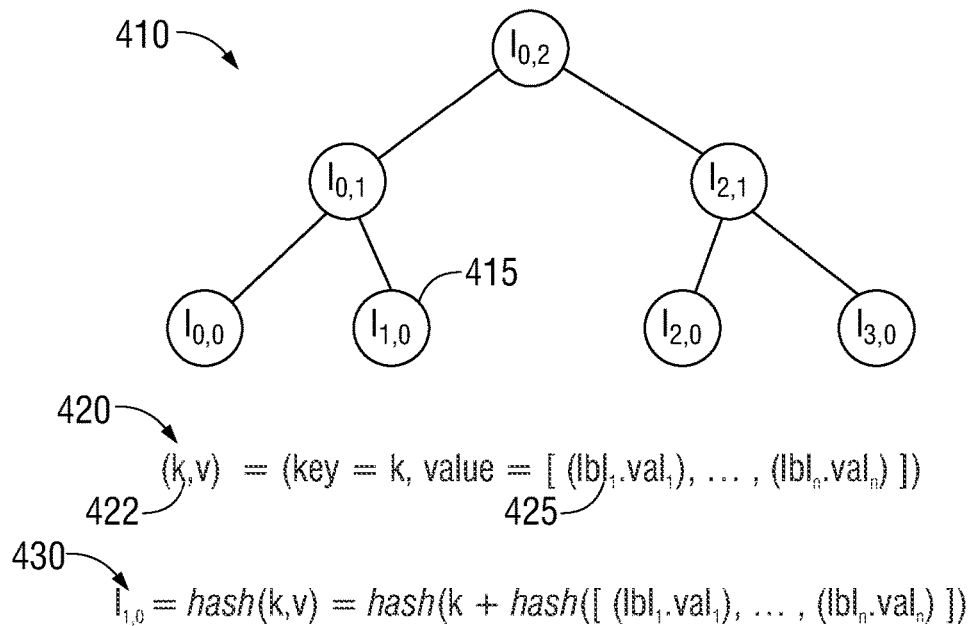
FIG. 4A illustrates an embodiment of a method of constructing a root hash for an exemplary transaction containing a key-value pair corresponding to a row of data in a relational database record.
Figure 4B:
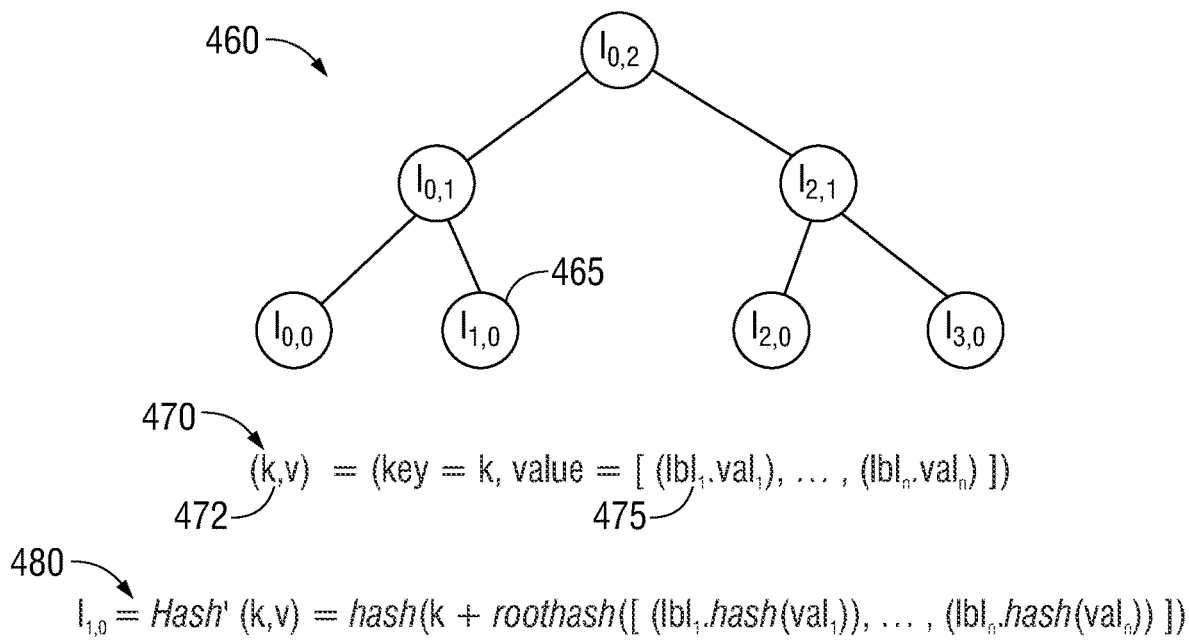
FIG. 4B illustrates an alternative embodiment of a method of constructing a root hash for an exemplary transaction containing a key-value pair corresponding to a row of data in a relational database record.
Figure 5:
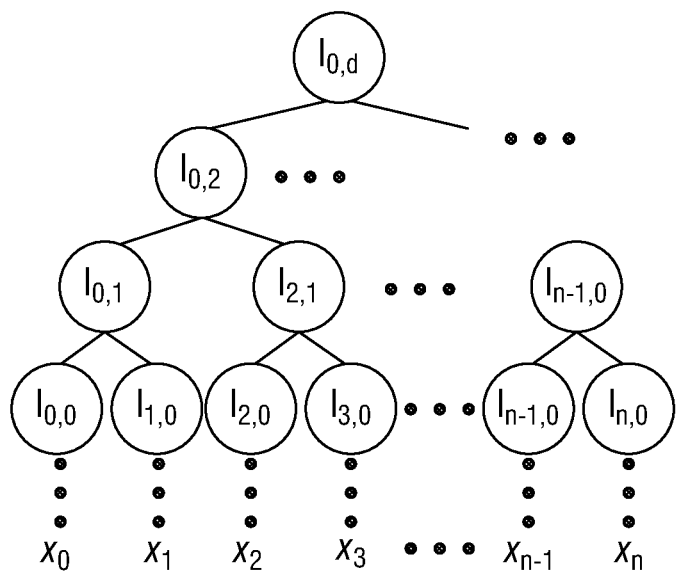
FIG. 5 illustrates an embodiment of an exemplary Merkle Hash Tree.
Figure 6:
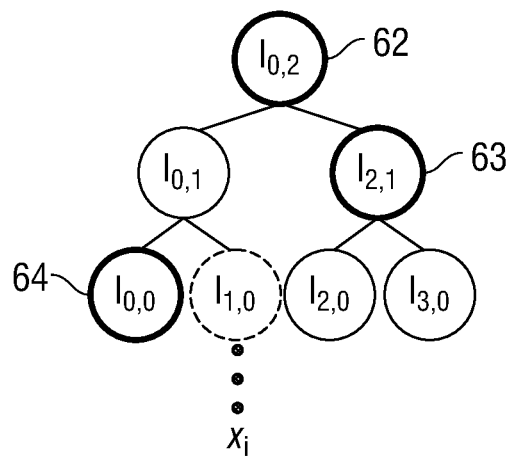
FIG. 6 illustrates an embodiment of a method for generating a proof of inclusion.
Figure 7:
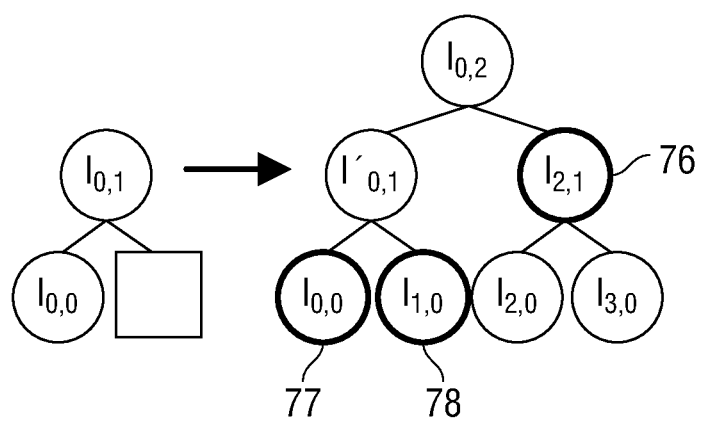
FIG. 7 illustrates an embodiment of a method for generating a consistency proof.

FIGS. 4A, 4B, and 2 illustrate embodiments of the methods and processes described herein.

In an embodiment illustrated in FIG. 4A, MHT 410 is the Merkle Hash Tree of a key-value data store with leaf $I_{1,0}$ (415) corresponding to transaction 420 containing key value pair (k,v) 422 corresponding to a row of data in a relational database record. The value component 425 of (k,v) has been split into n elements where each element includes a label corresponding to a column ID of the relational database record and the data value in that column in the row: [($lbl_1$:$val_1$), . . . , ($lbl_n$:$val_n$)]. This collection of pairs includes all data in the row. In this embodiment, leaf $I_{1,0}$ (415) stores the hash value 430 of the key-value pair 422 calculated as follows:

$$\text{hash}(key=k, value=[(lbl_1:val_1), \ldots, (lbl_n:val_n)]) = \text{hash}(k + \text{hash}([(lbl_1:val_1), \ldots, (lbl_n:val_n)]))$$

In the embodiment shown in FIG. 4A, it is difficult to generate an inclusion proof to show that a specific ($lbl_x$:$val_x$) entry, i.e., a specific column entry in the row, is included in the transaction 420. An auditor would have to know every $lbl_x$:$val_x$ element (every column entry in the row) to validate an inclusion proof for any specific ($lbl_x$:$val_x$) entry. It would not be possible to validate the contents of the value entry—which corresponds to the entire row of the relational database record—without knowing the column entry for every column in the row, i.e. [($lbl_1$:$val_1$), . . . , ($lbl_n$:$val_n$)].

Now consider the improved alternative embodiment illustrated in FIG. 4B. As in FIG. 4A, MHT 460 is the Merkle Hash Tree of a key-value data store with leaf $I_{1,0}$ (465) corresponding to transaction 470 containing key value pair (k,v) 472 corresponding to a row of data in a relational database record. The value component 475 of (k,v) (472) has been split into n elements where each element includes a label corresponding to a column ID of the relational database record and the data value in that column in the row: [($lbl_1$:$val_1$), . . . , ($lbl_n$:$val_n$)]. In this embodiment, leaf $I_{1,0}$ (465) stores the hash value 480 of the key-value pair 472.

In FIG. 4B, a different hash function Hash' (k.v) is used to compute hash value 480 over key-value pair 472. In an embodiment, Hash' (k.v) is a root hash of the hash tree computed over the n elements of value component 475:

$$\text{Hash'}(key=k, value=[(lbl_1:val_1), \ldots, (lbl_n:val_n)]) = \text{hash}(k + \text{rootHash}([(lbl_1:\text{hash}(val_1)), \ldots, (lbl_n:\text{hash}(val_n))]))$$

FIG. 2 illustrates how, in an embodiment, the root hash of a transaction containing one or more rows may be constructed. The embodiment illustrated in FIG. 2 assumes that a table named table1 has been defined with columns id, title, and active, and that a client has submitted the following INSERT (or UPSERT) command to the SQL engine to insert data values for key (id) values 10 and 11:
  INSERT INTO table1 (id, title, active) (10, 'title10', true) (11, 'title11', false)
After this transaction, table1 will include row values:

Row: (id:10, title: 'title10', active:true)
Row: (id:11, title: 'title11', active:false)

The SQL command can be translated into a transaction containing two key value entries 220, 225, each corresponding to a different row transaction:

('row' table1 id.10, id.10 title.'title10' active.true) (220)
('row' table1 id.11, id.11 title.'title11' active.false) (225)

The SQL command is saved in a transaction data store (not illustrated) in a transaction record 230 which contains a Txn number 231, one or more other fields 232 for data or metadata, and a key value field 233 comprising key-value entries 220 and 225. In an embodiment, transaction record 230 is an instance of a transaction record described in U.S. Nonprovisional patent application Ser. No. 17/508,916, System and Method to Shorten Cryptographic Proofs, which is hereby incorporated by reference.

As shown in FIG. 2, each key-value entry includes a key component and a value component. Key-value entry 220 includes key component 221 ('row' table1 id.10), key-value entry 225 includes key component 226 ('row' table1 id.11). Key-value entry 220 includes value component 222 (id.10 title.'title10' active.true), and key-value entry 225 includes value component 227 (id.11 title.'title11' active.false).

A hash tree 236 with root hash value R (240) can be computed over the one or more entries in the key-value field 233. The hash value R (240) can be stored in a MHT transaction hash tree with other data or metadata. In an embodiment, techniques described in U.S. Nonprovisional patent application Ser. No. 17/508,916, System and Method to Shorten Cryptographic Proofs, which is hereby incorporated by reference, can be used to generate cryptographic proofs, including inclusion proofs and consistency proofs, for transaction 230.

As explained above, transaction 230 includes key-value entries 220 and 225, each corresponding to a row in a relational database table table1. The value component 222 of key-value entry 220 is split into elements 252, 254, 256, and the value component 227 of key-value entry 225 is split into elements 253, 255, and 257, where each element includes a label value corresponding to a column ID and a value corresponding to the column entry in the row. For each element (252, 254, 256, 253, 255, and 257), a corresponding data pair is constructed. Each corresponding data pair (262, 264, 266, 263, 265, 267) contains the label and a hash of the value component (shown in FIG. 2 as H(value component)).

From these data pairs, the leaves of the hash tree 236 are created. Leaf $h_1$ (272) is the hash of data pair 262. Leaf $h_2$ (274) is the hash of data pair 264. Leaf $h_3$ (276) is the hash of data pair 266. Leaf $h_4$ (273) is the hash of data pair 263. Leaf $h_5$ (275) is the hash of data pair 265. Leaf $h_6$ (277) is the hash of data pair 267.

The hash tree entries on the left side of the hash tree 236 in FIG. 2 correspond to the first row in the transaction, the row with id 10 represented by key-value pair 220. Hash tree node $h_{12}$ (282)=H($h_1$+$h_2$), and hash tree node $h_{123}$ (286)=H($h_{12}$+$h_3$). Hash tree node 283 (H_id.10=H("'row' table1 id.10+$h_{123}$) combines the key component 221 of the key-value entry 220 ('row' table1 id.10) concatenated with hash value $h_{123}$ (286), which is the root hash computed from the different elements of value component 222 of the key-value entry 220. Hash tree entry 283 is the hash of the first row in the transaction. The hash tree nodes 272, 274, 276, 282, 286, and 283 form a sub-tree 285 of hash tree 236 corresponding to the first row in the transaction.

The hash tree entries on the right side of the hash tree 236 in FIG. 2 correspond to the second row in the transaction, the row with id 11 represented by key-value pair 225. Hash tree node $h_{45}$ (284)=H($h_4$+$h_5$), and hash tree node $h_{456}$ (288)=H($h_{45}$+$h_6$). Hash tree node 289 (H_id.11=H("'row' table1 id.11+$h_{456}$) combines the key component 226 of the key-value entry 225 ('row' table1 id.11) concatenated with hash value $h_{456}$ (288), which is the root hash computed from the different elements of value component 227 of the key-value entry 225. Hash tree node 289 is the hash of the second row in the transaction. The hash tree nodes 273, 275, 277, 284, 288, and 289 form a sub-tree 287 of hash tree 236 corresponding to the second row in the transaction.

The root (290) of the hash tree 236 is the hash of node 283 (hash H_id.10), the hash corresponding to the first row of the transaction, concatenated with node 289 (hash H_id.11), the hash corresponding to the second row of the transaction. This root (290) is R, the root (240) of the hash tree computed over the first and second rows in the transaction, represented by the key-value entries in transaction record 230.

The root value R (plus the appropriate intermediate node values) can be used to construct inclusion proofs for data in specific rows in a transaction. For example, as illustrated by FIG. 2, suppose an auditor requests an inclusion proof that a given value (e.g., 'title 10') was assigned to a column (e.g., title) in a row (the row with id 10). The inclusion proof values returned in response, in an embodiment, are the selected row elements, hash values corresponding to the other, non-selected row elements, and the hash tree node values required to complete the proof for the transaction, including the root hash and hash tree entries corresponding to the other rows in the transaction:

(id.10 title.'title10', active.H(true)), root hash R (290), and hash tree node (289)

With the selected row elements ((id.10 title.'title10') and hashes of the non-selected row elements (active:H(true)) (276), the auditor can compute the hash tree on the value elements to compute the hash tree node $h_{123}$ (286). In an embodiment, the validating auditor or application will have the table name (table1) and the row id values (id.10). The validator or application may have been the original source of the data values, the data may have been obtained in a separate transaction or provided by the database or server, in the same request or in a different one from the one the cryptographic proof is obtained. The auditor can concatenate and hash the known table and key identifiers and the node value $h_{123}$ (286) to compute the value of hash tree node 283 (H_id.10), the hash of the row. The auditor can combine the hash of the row (283) with the other hash tree node values returned in the inclusion proof results (in this example, node 289, the hash of the second row in the transaction) to compute the root hash 290 of the tree. If the computed root hash matches the root hash returned in the inclusion proof, the auditor can be confident that a given value (e.g., 'title 10') was assigned to a column (e.g., title) in a row (row with id 10) in the transaction stored in transaction record 230.

In one embodiment, as discussed above, the values of the non-selected columns in the query, e.g. active columns, are replaced with the hash of the associated value:

row: (id: 11, title: 'title11', active: hash(false)).

In another embodiment, a pruned hash tree can be built by preserving the leaves which are associated to selected columns:

row: (id, 11, title, 'title11', hash((label: 'active', value: false)))

In an embodiment, an inclusion proof for a row entry pertains to a specific transaction. It is also possible to prove that a row contains a specific value up to a given transaction. When a query is resolved, it is resolved based at the specific instant determined by a transaction. The rows will be associated to a particular transaction. Thus, it is possible to build a cryptographic proof for each row in the transaction in which it was inserted. As when resolving queries, data is returned, but it may be the case that the data is not current, because new data could have been inserted while the query is being resolved. But still, it can be proved that the returned data was valid at that moment. Based on the primary key of a row, it is possible to obtain the key-value entry where the row data is stored. Then it is possible to do inclusion proof of such key-value entry in the transaction and a consistency proof of such transaction against the current hash of the database. It is also possible for the client to compare the value of interest with the value stored in the identified key-value entry based on the primary key of the row.

A client request for an inclusion proof can be made with different options, including http request, using a RPC (Remote Procedure Call), or GRPC which provides a high level solution for communicating applications over the network.

In the example shown in FIG. 2, the underlying SQL command inserted two rows, the transaction record 230 included two key-value transactions 220, 225, one for each row, and the hash tree 236 included 2 sub-trees 285, 287, each corresponding to one of the rows. The methods described herein can be extended to transactions including more rows. For example, if the underlying SQL command had operated on 3 rows, the hash tree would have included three sub-trees, one for each of the three rows.

In the alternative embodiments illustrated in FIGS. 4B and 2, although row data corresponding to a table in a relational database is stored as key-value entries in a transaction data store, hash values (instead of the actual data) can be provided to a client as part of a cryptographic proof, i.e. [($lbl_1$:hash($val_1$)), . . . , ($lbl_n$:hash($val_n$))]. It is also possible to validate the columns that received a value when the row was inserted and to prove that there is no column duplication, i.e. different values specified for the same column within the same row.

In an embodiment, each transaction in the transaction data store has a corresponding leaf in the MHT which includes a root hash computed over all key-value entries in the transaction. The hash values in the MHT can be used to create cryptographic proofs such as inclusion proofs and consistency proofs for each transaction. The hash values for the leaves in MHT 460 (FIG. 4B) differ from the hash values for the leaves in MHT 410 (FIG. 4A) in that each hash value in a leaf in MJT 460 includes the root of a hash tree computed over split row elements, as opposed to a hash of the entire value, considered as an array of bytes. These hash tree values can be used to create cryptographic proofs corresponding to specific column values with a row.

The introduction of changes to an existing data model is expected in most applications. The following describes embodiments of solutions for handling the situation where different rows of a table have different sets of columns, either by addition or deletion of columns from a table. It is worth noting that the same principles will apply to other types of entities such as documents.

Deletion of columns may be handled without special consideration on how the hash of entries are calculated. Rows inserted after the column is deleted will not include a value for the deleted column. Rows inserted before the column is deleted will retain a data entry value for the column, otherwise the hash value of the row will be different. The actual data associated with a deleted column may be erased but the information needed to re-calculate the hash of the entry (hash of the data or a labelled hash value) preferably will be preserved. Queries may not be able to include non-existent or removed columns, and the queries may be resolved in the same manner as described on how to deal with partial data.

The addition of new columns in an embodiment requires special consideration for calculating or at least validating row data. Even when columns are explicitly set to a null value when the row is originally stored, it may not be possible to update the original value when a new column is added. In an embodiment, to provide a consistent validation of already inserted rows after a column has been added, the hash calculation for the entry may not consider null values if they were not originally present when the row was inserted. During validation, if a column receives a null value, the column must be null or not included in the list of columns of the stored row.

The following discussion describes an illustrative flow of an embodiment of the methods described herein. In this embodiment, a relational database is created by a client and stored in a key-value database. When a client makes a SQL request to the SQL Engine, the SQL Engine maps the client's SQL request into key-value entries. When resolving the query, the database will locate the corresponding key-value pairs and return them in the form of row data, as requested in the query, and optional also cryptographic proof data corresponding to the key-value transaction.

A Table is created. For example:
table1 (id INTEGER, title STRING, year INTEGER, PRIMARY KEY id)

Rows are inserted: (1, "book1", 2020), (2, "book2", 2021) using INSERT (or UPSERT) SQL commands, e.g., INSERT INTO table1(id,"book1", 2020).

As discussed above, the row values in the INSERT SQL command will be converted to key-value data entries and stored in a key-value data store. A hash tree will be constructed for each of the two rows from the values and column IDs in the row. The transaction based on this SQL command will have its own hash tree constructed from the hashes of the two rows contained in the transaction. The hash of the transaction will be added to a global hash tree that preserves the state of the key-value data store by including hash values of every transaction in the key-value data store. Exemplary embodiments of systems and methods for constructing hash values for transactions and storing the hash values in a hash tree are described in U.S. patent application Ser. No. 17/508,916, filed Oct. 22, 2021, the contents of which are hereby incorporated in their entirety.

Subsequently, the database may be examined with a SQL Query that includes a sublist of the columns specified in the table: SELECT id, year FROM table1

Cryptographic proofs can be generated for returned rows [(1, 2020), (2, 2021)], including the values for the columns specified in the query and the hash values for the columns included when the row was inserted but not specified in the query.

The returned rows contain the actual value for selected columns and the hash of the values for the other columns e.g. row1=(1, hash("book1"), 2020), row2=(2, hash("book2"), 2021).

The provided row data serves to re-calculate the hash of the entry storing the row (primary key entry) and validate no duplicated columns because the complete list of columns are received as well as the hash values for the columns not specified in the query. Other cryptographic proof data, including the root hash for the entire transaction and the root hashes for other rows in the transaction (in an embodiment, the root hashes of the sub-trees associated with the other rows) can be used to confirm that the returned rows are included in the transaction.

Given the hash of the entry is calculated by means of a cryptographic hash function e.g. SHA256, SHA512, it is practically impossible to re-calculate the hash of the entry using values that were not originally used. Thus if a returned row contains incorrect data e.g. (1, 2022), when calculating the hash even when using the correct value for the missing column, the resulting value will differ from the original one.

In an alternative embodiment, returned rows may not contain the hash values for the columns not included in the query, but that information can be requested based on the row identifier i.e. primary key.

In an alternative embodiment, if the underlying storage does not support split values, it is possible to build the hash tree as described in FIG. 2 for the value associated with the key and mapping using an additional entry:

(pk:id, [(lbl$_1$:val$_1$), . . . ,(lbl$_n$:val$_n$)])
(hash:id, [(lbl$_1$:hash(val$_1$)), . . . ,(lbl$_n$:hash(val$_n$))])

In this example, an additional entry is needed to store, lookup and validate. The validator, when receiving partial data of a row, needs to obtain the hash associated with the entry based on the primary key. By getting the entry (hash: id, [(lbl$_1$:hash(val$_1$)), . . . , (lbl$_n$:hash(val$_n$))]), the validator is able to build the hash tree for the values and determine the validity of the partially returned values and confirm that there is no column duplication.

In an embodiment, the API recognizes a command SAFEQUERY which confirms that the data returned by an SQL query has not been tampered with. In an embodiment, the SAFEQUERY command includes an SQL query and a value "r" corresponding to the client's previously validated state of the data store, the most recently validated hash tree validated by the client).

Figure 10:
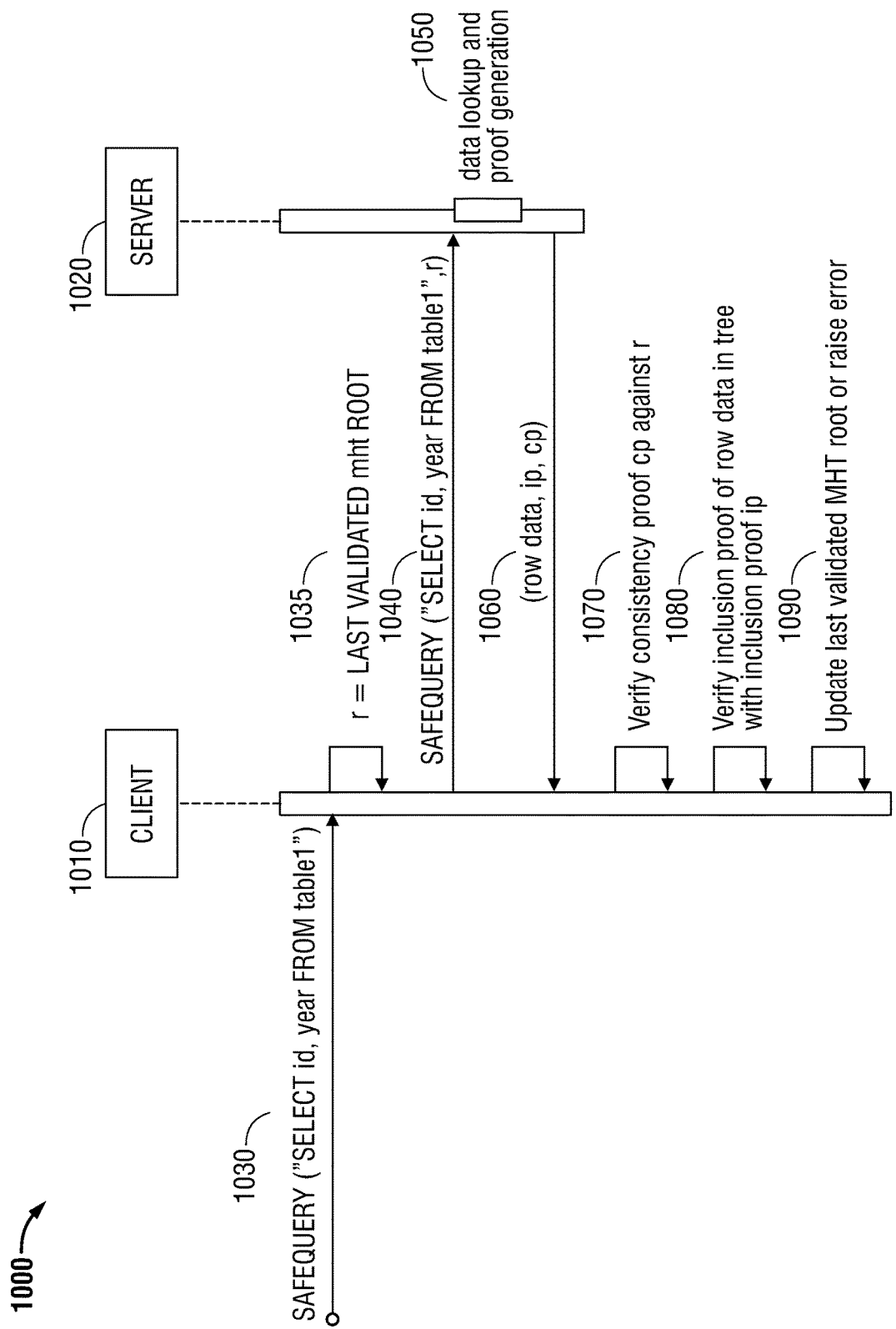
FIG. 10 illustrates the operation of an exemplary SAFE-QUERY command.

FIG. 10 illustrates the operation of an exemplary SAFEQUERY command 1030 based on the SQL query SELECT id, year FROM table1. Client 1010 retrieves its value of r (1035) and uses that value r to form the SAFEQUERY command 1040, which is transmitted to server 1020:

SAFEQUERY ("SELECT id, year FROM table1", r).

Server 1050 searches its key-value data stores and MHTs and returns response 1060 to the query 1035. Response 1060 includes row data, inclusion proof (ip), and consistency proof data (cp). Client 1010 uses consistency proof data 1070 to perform a consistency proof based on the value 4, the client's previously validated state of the data store. The client can also use inclusion proof 1080 to verify that the row data returned in 1060 is included in the data store. If the consistency proof or inclusion proof fail, the client can raise an error. If not, the client updates its current validated MHT root.

In an embodiment, the query could have parameters for the values e.g. "SELECT id, year FROM table1 WHERE year=@year", and then the parameters would need to be provided so the query can be executed.

The SAFEQUERY command may return data from multiple rows. In an embodiment, an inclusion proof and a consistency proof are returned for each row. When the following command is input:

SAFEQUERY ("SELECT id, year FROM table1", r).

The command returns the same row data as the SQL query, plus cryptographic proof data to confirm that the data has not been tampered with:

---
row1=(1, hash("book1"), 2020) + Inclusion Proof + Consistency Proof
row2=(2, hash("book2"), 2021) + Inclusion Proof + Consistency Proof

---

In an embodiment, each row will have its own inclusion proof to calculate the hash of the transaction that contained it.

In an embodiment, it is possible to do a consistency proof for each hash of a previous transaction to the latest committed transaction. In an alternative embodiment, it is possible to perform a consistency proof between the transactions involved in the query starting with the hash of the transaction validated by the client application. Assume, for example, that the client application has already validated up to transaction 1000, the query contains rows in transactions 10, 500, 1500, and the latest committed transaction is 2000. The consistency proofs may be done from 10 to 500, from 500 to 1000, from 1000 to 1500 and finally from 1500 to 2000. And the client will store 2000 as the latest validated one.

It is possible that a query may return row data that was added in different transactions. In this situation, in an embodiment, an inclusion proof can be generated for each row with respect to the transaction where the row data was added. Consistency proofs can be generated from the latest validated transaction in the client, with the transactions involved in the query result and preferably against the newest transaction in the database. Alternatively, an inclusion proof can be generated of the transactions against the latest one and a consistency proof can be generated from the validated one against the latest one.

The same methods and systems described herein can be extended to databases that employ a document model. Instead of a table with rows and columns, the primary data structure is a document with attributes. Documents and attributes may be linked to key-value entries, and the hash tree for the document attributes may be computed as described above for a relational data model.

The systems and methods described herein may be extended to a graph data model containing nodes and links (or edges) between nodes. In a graph data model, instead of tables or documents, the basic entity is a node, nodes may have attributes (like documents) and may be linked to other nodes. Links between nodes may contain attributes. Nodes and links may be mapped to key-value entities, and the hash tree for the attributes may be calculated as described herein for the relational data models.

Disclosed now is an exemplary application of the methods and systems described herein within the field of Auditable Change Management (ACM). Auditable recording of changes within an IT infrastructure supports critical licensing, auditing, and security functions.

A valuable application, for example, is to track all kinds of changes that happen in the lifetime of a virtual machine. Changes such as addition of memory, setting a cpu limitation, or changing the network port group should not happen unnoticed. Correlating changes and performance data can go a long way to find the root cause of an issue. It can also be used to monitor or prove compliance with software license terms. ACM provides not only an automated recording of all configuration changes but stores them using an immutable storage system. That is key to having an auditable and verifiable recording.

Figure 15:
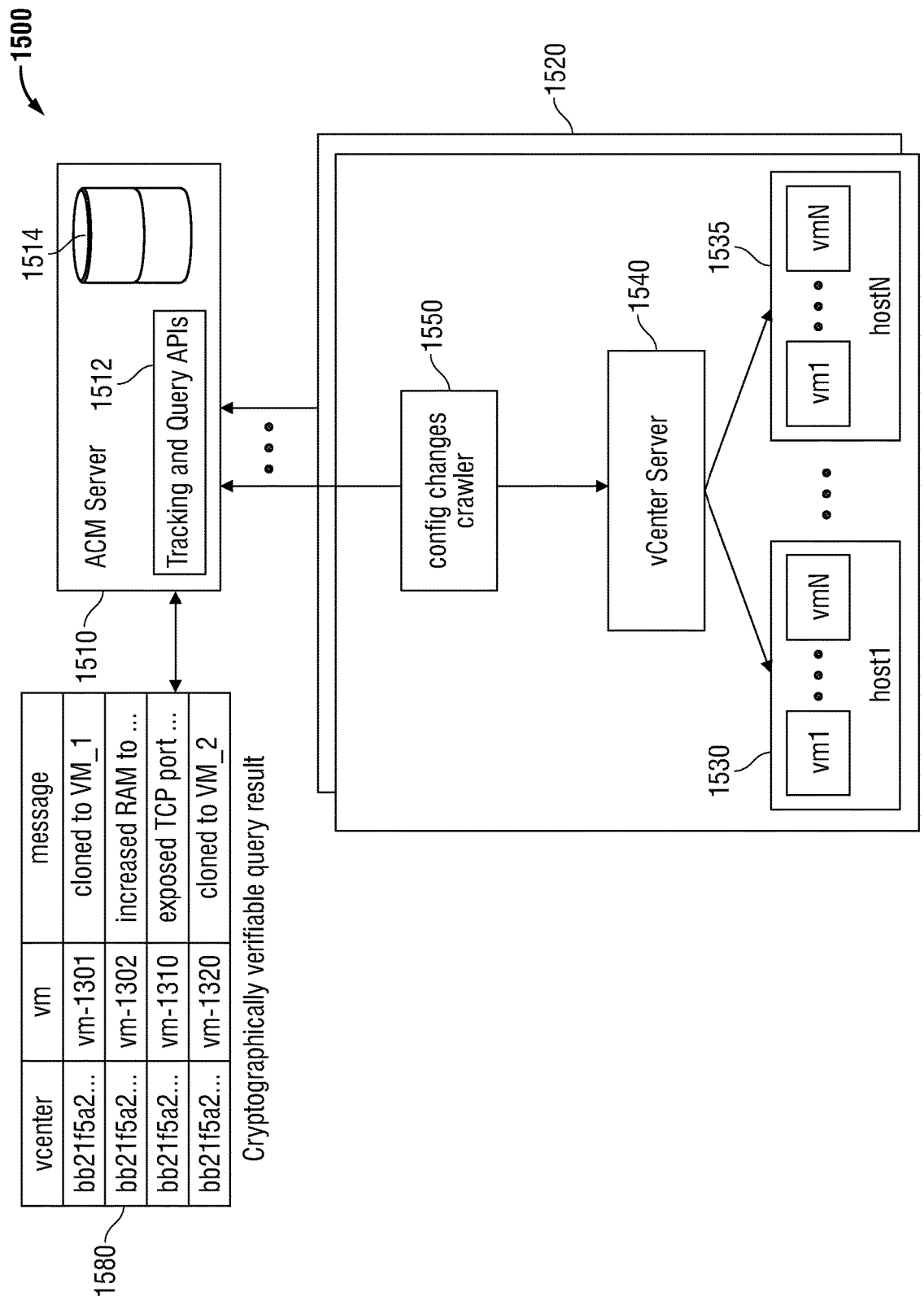
FIG. 15 illustrates an embodiment of an auditable change management system.

FIG. 15 depicts different systems and components involved in an exemplary embodiment of an ACM system deployment 1500, including ACM server 1510 and virtual machine deployment system 1520. Exemplary virtual machine deployment system 1520 includes multiple virtual machine hosts 1530, 1535, each hosting one or more virtual machines, one or more VMWare® vcenter servers 1540 to manage the virtual machines, multiple VMWare ESXi hypervisor hosts, and all dependent components, and configuration changes crawler 1550, which captures and pushes configuration changes from a vCenter server 1540 into an ACM server 1510. ACM server 1510 hosts an ACM database system (not shown) which includes immutable data storage 1514 and tracking and querying APIs 1512. Also illustrated in FIG. 15 are exemplary query responses 1580.

The underlying storage 1514 for ACM server 1510 may be a relational data model, leveraging SQL to provide rich query capabilities. FIG. 11 illustrates an exemplary Table definition 1100 in an embodiment of a relational data model in the ACM database system.

While lots of data associated with the event is stored, only a fragment of this data may be relevant in a given context. As an example, the client may only be interested in clone events at a specific date. For each clone event, the client wants to check the infrastructure system identifier (VMware vCenter UUID in the example), the virtual machine identifier and the change log registered in the ACM system since its start. Query 1200 in FIG. 12 illustrates an exemplary query to retrieve the value of the columns containing the infrastructure system identifier, the virtual machine identifier and the change log registered in the ACM system since its start. Result 1300 in FIG. 13 illustrates an exemplary query result including partial data from the retrieved record. In this case, the ACM system only needs to provide partial data associated with each event. Fetching the complete record from the database may be a waste of resources, penalizing the performance of the system as a whole. The number of events being tracked by an ACM system may be in the order of millions or billions of events. Reducing to the minimum the amount of record data retrieved while still being able to detect any tampering attempt provides a significant technological benefits, for example, by avoiding significant computational performance penalties that would be incurred if the entire contents of a data record were required to prove data originality.

However, cryptographic verifications may require the complete record, because it may not be possible to verify results consisting of partial information. The methods and systems described herein enable efficient cryptographic validation of query results that return part of the data in a record, without penalizing performance of the system. When the query result is subject to cryptographic verification, the result may not only include the matching rows with the list of selected columns but also a list of hash values that can be used to calculate the hash of the entire row and validate the provided values for the row are consistent with these values. In an embodiment, the hash values have been previously stored with the data values in the record. In another embodiment, the hash values are computed when the query result is returned.

FIG. 14 illustrates another exemplary query result 1400 that illustrates partial data from records and also hash values for the other data values in the row. Query result 1400 illustrates the extended result with hash values per row that enable re-calculation of the hash value of the entire row even when only a subset of the columns includes the actual value. The contents of an embodiment of an exemplary query result 1400 are described below:

Query result 1400 includes query results 1440, meaning the values for the requested columns in the record(s) retrieved by the query.

Query result 1400 also includes transaction header data 1410 about the transaction (i.e., the transaction that originally created the record, e.g., with an INSERT INTO statement) that can be used for cryptographic proofs, including a unique identifier for the transaction the previous hash, the number of entries, and the entries hash.

Query result 1400 also includes inclusion proof values data 1420, which can be used to calculate row hash values (entry hash) from valued columns, to prove data originality of the column entry.

Query result 1400 also includes row inclusion proof data 1430, including hash values used to calculate entries hash from row hash values (entry hash), to prove data originality of the row in the table.

Figure 8:
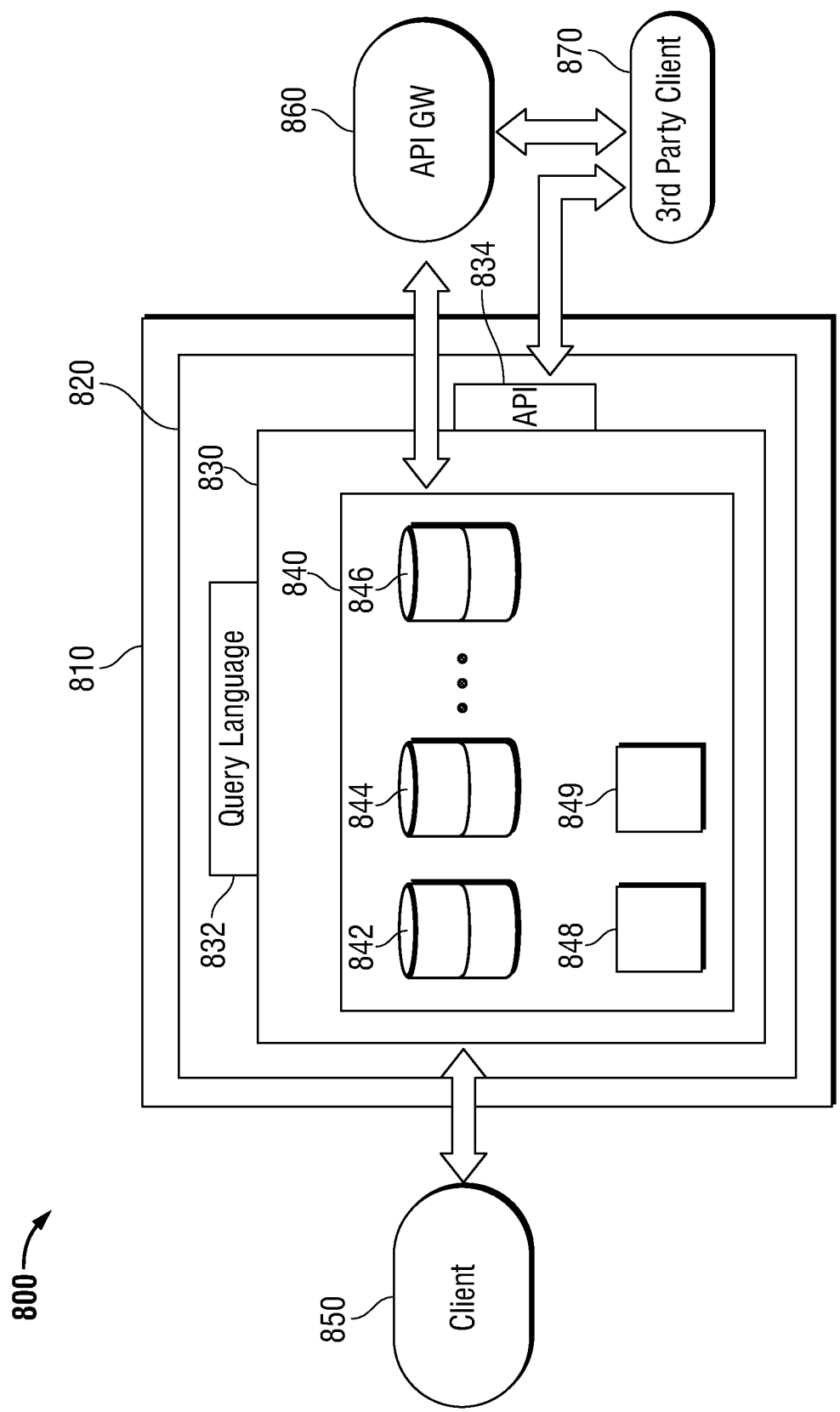
FIG. 8 illustrates an exemplary computing system environment.

FIG. 8 illustrates an embodiment of an environment 800 to support and implement the methods and systems described herein. Environment 800 includes computing system 810, which hosts the software and hardware resources required to implement the methods described herein, and includes one or more computers. Each computer includes memory to store data and the computer software and instructions that implement the methods described herein, at least one processing unit to execute the computer software and instructions, persistent storage to store data, and network/communication subsystems to network and communicate with other computer systems. One or more computers may be virtual. The computers are preferably connected via one or more networks, and software tasks and data storage may be distributed over one or more computers. Computing system 810 may be deployed in whole or in part on computer(s) or hardware appliance(s) or virtual machines located in whole or in part on-site or in the cloud. Computing system 810 may include one or more web servers, application servers, or data servers.

Computing system 810 includes software system 820. Software system 820 includes the software and instructions to implement the methods described herein. Software system 820 also includes software and instructions, including application software. Software system 820 includes user interface software, including one or more APIs 834, to communicate with, ingest, receive or respond to requests for data from, and provide access to the system to, authorized clients 850 and third-parties 870. Software system 820 may also support an API gateway 860. In an embodiment software system 820 provides firewall and other security functions to perform authentication and prevent unauthorized access to the system. Software system 820 in an embodiment includes query language software and interface 832 for accessing and querying the one or more data stores in core 840.

Software system 820 includes core 830, which provides the software to support core system applications and persistent data storage management. Core 830 includes one or more persistent data stores 842, 844, and 846. Persistent data stores 842, 844, 846 may be used for storing system data, application data, performance metrics, sensor data, digital documents, log data, client transaction data, for example one or more key-value data stores, value store, transaction metadata, such as one or more Merkle tree or incremental hash trees, index data, or any other collection of data. One or more persistent data stores may include a relational database, a noSQL database, a directory, a key-value store, an append-only data file, or any other data file or data structure operative to store data for use by a computer application or system. Persistent data stores 842, 844, 846 may include data or metadata for one or more clients. Client transaction data (for example, key-value data store) or metadata may be subdivided or stored in one or more parts or partitions stored in persistent data stores 842, 844, and 846. Core 830 may include, in an embodiment, other application software or software modules 848, 849 such as an SQL engine, a root signer, and a proof generator. In an embodiment, software system 820 comprises environment illustrated in FIG. 3.

Figure 9:
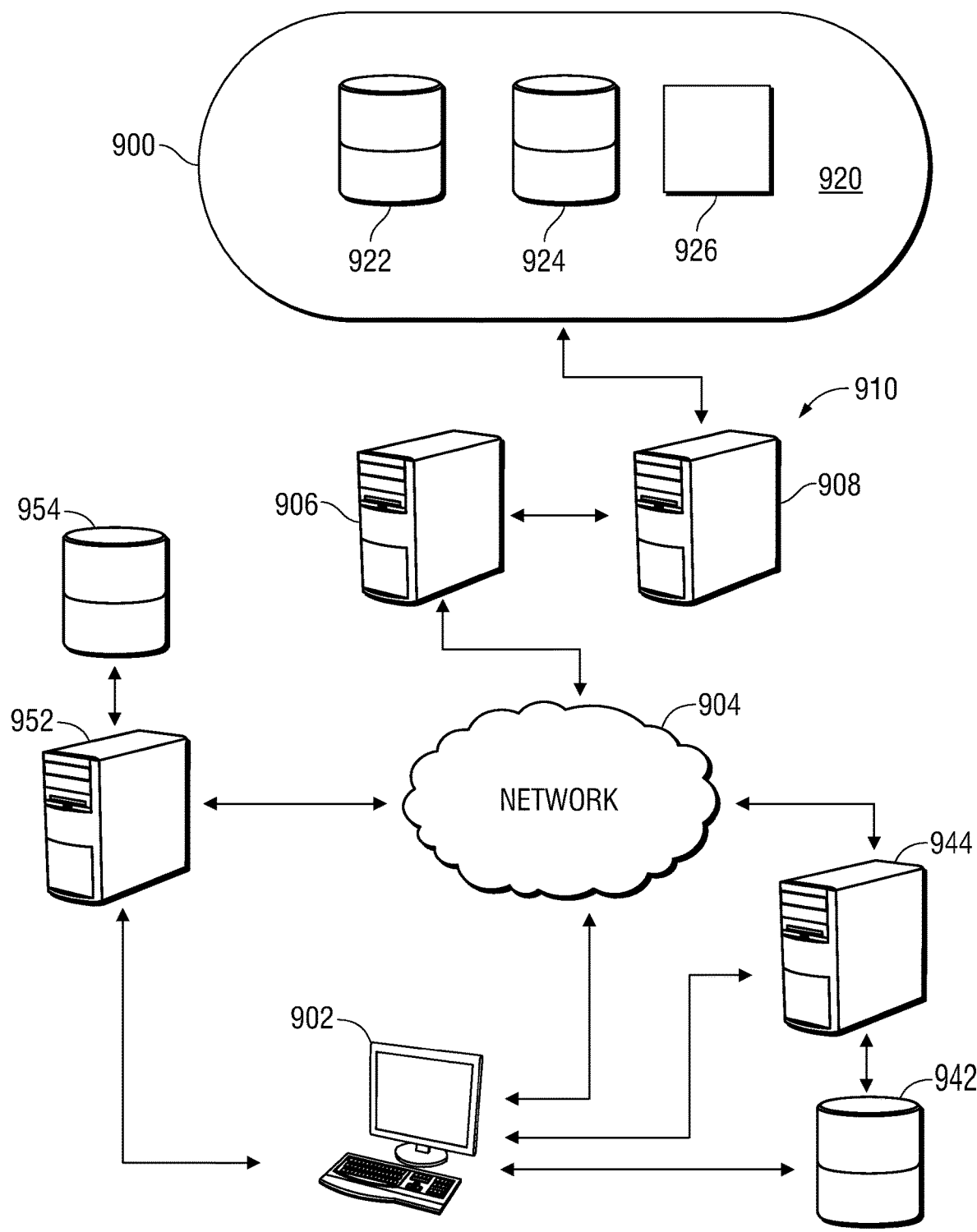
FIG. 9 illustrates an exemplary hardware environment.

FIG. 9 illustrates aspects of an exemplary embodiment of a hardware environment 900 for implementing the methods and systems described here. The exemplary environment 900 includes an electronic client device 902, which can include any appropriate device or collections of devices with memory, CPUs, and executable software instructions operable to create, access, update, and maintain one or more databases or datastores, perform cryptographic proofs, send and/or receive requests, messages, or information over an appropriate network 904 and, in some embodiments, convey information back to a user of the device. Examples of such client devices include personal computers, workstations, servers, cell phones, handheld messaging devices, laptop computers, tablet computers, set-top boxes, personal data assistants, embedded computer systems, electronic book readers, and the like. The network 904 can include any appropriate network, including an intranet, the Internet, a cellular network, a local area network, a wide area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 906 for receiving requests and serving content in response thereto, although for other networks an alternative device serving a similar purpose, or web server software implemented on an application server, could be used as would be apparent to one of ordinary skill in the art.

In an embodiment, client device 902 is coupled directly or indirectly, via for example network 904, to a one or more client databases 954 hosted or served by one or more database servers (952), including without limitation those commercially available from Oracle (registered trademark), Microsoft (registered trademark), Sybase (registered trademark), and IBM (registered trademark), as well as open-source servers such as MySQL, Postgres, SQLite, MongoDB, Redis, and any other server capable of storing, retrieving, and accessing structured or unstructured data. Database servers may include table-based servers, document-based servers, unstructured servers, relational servers, graph database servers, non-relational servers, or combinations of these and/or other database servers.

In addition, in an embodiment, client device 902 is coupled directly to one or more data stores 942, or indirectly via one or more servers 944. Data store(s) 942 may contain one or more client data stores containing data corresponding to data stored elsewhere, for example, in a key-value data store hosted on computing system 910 or 810 (in FIG. 8). Data store(s) 942 may include software instructions, metadata, and/or data for performing cryptographic proofs, including metadata, MHTs, and data supplied by other computer systems and software systems, including systems 910 and 920.

In an embodiment, client device 902 may be employed by client 850 to access computing system 810 (FIG. 8). Client 850 uses computing systems 810, 910 and software system 920 and the methods and processes described herein to maintain an immutable data store to confirm the validity and integrity of transactions in and to client's one or more client databases 954. Client 850 transmits queries, storage requests, and other instructions to the server hosting the immutable data store, receives in response transaction data and cryptographic proof data, and verifies the authenticity and originality of the transaction data by performing cryptographic proofs. Client may use a communications channel to transmit and receive queries and requests for cryptographic proofs and receive the results.

The illustrative environment includes computing system 910 and software system 920, which include, for example, in an embodiment, computing system 810 and software system 820 shown in FIG. 8 and described above. Computing system 910 includes at least one application server 908 (which may include one or more data stores). It may also include one or more data servers hosting one or more data stores (not shown). It should be understood that there can be several application servers, layers, or other elements, processes, or components, which may be chained or otherwise configured, which can interact to perform tasks such as hosting or obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any nontransitory computer readable storage media, and any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device 902 may be processed by the client device to provide the content in one or more forms including, but not limited to, forms that are perceptible to the user audibly, visually, and/or through other senses. The handling of all requests and responses, as well as the delivery of content between the client device 902 and the application server 908, can be handled by optional web server 906 using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

Software system 920 can include several separate data tables, data stores, databases, data documents, dynamic data storage schemes, and/or other data storage mechanisms and media for storing data relating to a particular aspect of the present disclosure. For example, software system 920 may store or host one or more key-value data stores, MHTs, and an SQL Engine. Software system 920 may also include application code software, modules, and/or logic 926 operable, through logic associated therewith, to receive instructions from the application server 908 and obtain, update, or otherwise process data in response thereto.

Each server typically will include an operating system that provides executable program instructions for the general administration and operation of that server and typically will include a computer-readable storage medium (e.g., a hard disk, random access memory, read only memory, etc. storing instructions that, when executed (i.e., as a result of being executed) by a processor of the server, allow the server to perform its intended functions. The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the hardware environment 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as containers, virtual machines, hypervisors, and other virtual devices capable of communicating via a network.

Various embodiments of the present disclosure utilize at least one network 904 that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UPnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server 906, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java (registered trademark), Go, C, C#, or C++, or any scripting language, such as Ruby, PHP, Perl, Python, or TCL, or Net, and NodeJS, as well as combinations thereof. The server(s) may also include database servers, database emulators, and SQL engines, including without limitation those commercially available from Oracle (registered trademark), Microsoft (registered trademark), Sybase (registered trademark), and IBM (registered trademark), as well as open-source servers such as MySQL, Postgres, SQLite, MongoDB, Redis, and any other server capable of storing, retrieving, and accessing structured or unstructured data. Database servers may include table-based servers, document-based servers, unstructured servers, relational servers, graph database servers, non-relational servers, or combinations of these and/or other database servers.

The environment can include a variety of data stores and other memory and storage media as discussed above. In an embodiment, computing system 910 resides on a single machine. In alternative embodiments, computing system 910 resides in a variety of locations, such as on a storage medium local to (and/or resident in) one or more of the computers or remote from any or all of the computers across the network. The information may reside in a storage-area network ("SAN"). Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory, as described above. The computer-readable storage media reader can be connected with, or configured to receive, a computer-readable storage medium, representing remote, local, fixed, and/or removable storage devices as well as storage media for persistently, or temporarily and/or more permanently, containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors.

The computer-readable storage medium may be non-transitory. The term "non-transitory," as used herein, defines a characteristic of the medium itself (i.e., tangible, not a signal) as opposed to a characteristic of data storage persistency (e.g., RAM vs. ROM). In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Further, in some examples, the executable instructions are executed such that different instructions are executed by different processors. As an illustrative example, a nontransitory computer-readable storage medium may store instructions. A main CPU may execute some of the instructions and a specialized processor unit (including for example a math co-processor, a cryptographic co-processor, or a graphics co-processor) may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

Any computer, server, computer system, server system, data store, or database system described herein, including processors, memory, data stores, and other components, includes, and its functions may be performed in whole or in part by, a virtual computer, virtual server, virtual computer system, virtual server system, virtual data store, or virtual database system, including for example those provided by Amazon Web Services®.

In an embodiment, the present disclosure describes methods and systems of storing and retrieving complex data entries and mapping complex data entries to and from an immutable key-value data model.

In an embodiment, the present disclosure describes systems and methods in which subdata or derived data is returned as result of a query.

In an embodiment, the present disclosure describes systems and methods wherein data returned by a query is cryptographically verifiable.

In an embodiment, the present disclosure describes systems and methods wherein data returned by a query is cryptographically verifiable without the need of the complete dataset.

In an embodiment, the present disclosure describes systems and methods wherein the underlying key-value storage is extended to calculate the hash of the entry not as a plain value but as a cryptographic data structure, i.e. a hash tree In an embodiment, the present disclosure describes systems and methods wherein the underlying key-value storage calculates the hash of the entries as plain values, and additional entries are stored for the validation of the entry without the need of a complete data of the entry associated with the values of the complex entity.

In an embodiment, the present disclosure describes systems and methods wherein queries are made using a relational data model and a query on a row could select some but not all of the columns defined for the table.

In an embodiment, the present disclosure describes systems and methods wherein queries are made using a document-like data model and a query on a document could select some but not all of the properties or attributes defined for the document.

In an embodiment, the present disclosure describes systems and methods wherein queries are made using a graph data model and a query on a node (or link) could select some but not all of the attributes defined for the node (or link).

Although embodiments of the present invention have been described in detail, it will be apparent to those skilled in the art that many embodiments taking a variety of specific forms and reflecting changes, substitutions and alterations can be made without departing from the spirit and scope of the inventions disclosed herein. The described embodiments illustrate the scope of the claims but do not restrict the scope of the claims.

What is claimed is:

1. A method of managing data in a computer-hosted database system providing cryptographic verifiability and comprising an immutable key-value data store, the method comprising: hosting a computer-hosted database system comprising an immutable key-value data store,
   wherein the computer-hosted database system comprises one or more data records and cryptographic proof data associated with the one or more data records,
   wherein the data in a data record is stored as one or more key-value entries in the immutable key-value data store, and the logical structure of a data record is defined by a rich data model and comprises two or more data fields, including a first field and a second field,
   wherein the rich data model comprises a relational data model or a document data model,
   wherein in the relational data model, the data record comprises a table comprising one or more rows, the two or more data fields comprise columns supported by the rich data model, the first field is a first column, and the second field is a second column, and
   in the document data model, the data record comprises a document comprising two or more attributes supported by the rich data model, the first field comprises a first attribute, and the second field comprises a second attribute,
   wherein the computer-hosted database system comprises a first data record comprising transaction data, including first transaction data stored in the first field and second transaction data stored in the second field, and cryptographic proof data associated with the first data record (first data record proof data);
   receiving a data retrieval instruction requesting retrieval of data stored in the first field but not data stored in the second field, wherein the data retrieval instruction requests retrieval at the column or attribute level supported by the rich data model; and
   returning, in response to the data retrieval instruction, the first transaction data stored in the first field and first cryptographic proof data sufficient to prove data originality of the first transaction data stored in the first field without knowledge of the second transaction data stored in the second field, wherein returning first cryptographic proof data comprises returning first cryptographic proof data at the column or attribute level supported by the rich data model.

2. The method of claim 1, wherein the first transaction data is stored in a first key-value entry and the second transaction data is stored in a second key-value entry.

3. The method of claim 2, wherein the first data record proof data comprises a root hash value of a hash tree comprising a first hash value computed on the first key-value entry and a second hash value computed on the second key-value entry.

4. The method of claim 1, wherein the computer-hosted database system further comprises a Merkle hash tree comprising the cryptographic proof data associated with the one or more data records.

5. The method of claim 1, wherein the first data record proof data comprises a root hash value computed over a hash tree comprising the transaction data.

6. The method of claim 1, wherein the first transaction data is stored in a first key-value entry, the second transaction data is stored in a second key-value entry, and the first cryptographic proof data comprises a hash value computed on the second key-value entry.

7. The method of claim 1, wherein the first data record comprises a first table, the first transaction data is stored in the first column and the second transaction data is stored in the second column, the data retrieval instruction comprises a SQL command that requests retrieval of data in the first column but not the second column, and the response to the SQL command comprises the first transaction data and a hash value computed over a key-value entry comprising the second transaction data stored in the second column.

8. The method of claim 1, wherein the data retrieval instruction is received from a client, and the response is returned to the client, over a communications channel operatively coupled to the computer-hosted database system.

9. The method of claim 1, wherein the data retrieval instruction comprises a request for cryptographic proof data.

10. The method of claim 1, further comprising the step of storing the transaction data in the first data record, comprising:
receiving a data storage instruction comprising instructions to store the first transaction data in the first field and to store the second transaction data in the second field;
storing the first transaction data in the first key-value entry and storing the second transaction data in the second key-value entry;
computing a first hash value computed on the first key-value entry and a second hash value computed on the second key-value entry; and
storing in the cryptographic proof data the root hash tree value of a hash tree comprising the first hash value and the second hash value.

11. The method of claim 1, thereby avoiding significant computational performance penalties that would be incurred by requiring the entire contents of a data record to prove data originality.

12. The method of claim 1, wherein the computer-hosted database system comprises an auditable change management system.

13. The method of claim 1, wherein the first cryptographic proof data is sufficient to prove data originality without a complete copy of all transaction data in the first data record.

14. The method of claim 1, wherein the data retrieval instruction specifies a logical column or attribute element defined in the rich data model.

15. The method of claim 1, wherein the first transaction data and the second transaction data are stored in a first key-value entry in the immutable key-value data store, and returning the first cryptographic proof data comprises splitting the value component of the first key-value entry into 2 or more elements and computing a hash tree over the two more elements of the value component of the first key-value entry.

16. A computer-hosted database system providing cryptographic verifiability, comprising:
an immutable key-value data store,
wherein the computer-hosted database system comprises one or more data records and cryptographic proof data associated with the one or more data records,
wherein the data in a data record is stored as one or more key-value entries in the immutable key-value data store, and the logical structure of a data record is defined by a rich data model and comprises two or more data fields, including a first field and a second field,
wherein the rich data model comprises a relational model, wherein the data record is a table and the fields are columns supported by the rich data model, or a document model, wherein the data record is a document and the fields are attributes supported by the rich data model, and
wherein the computer-hosted database system comprises a first data record comprising transaction data, including first transaction data stored in the first field and second transaction data stored in the second field, and cryptographic proof data associated with the first data record (first data record proof data); and
one or more processors operatively coupled to a non-transitory data store and the immutable key-value data store, wherein the non-transitory data store comprises executable instructions that, when executed by the one or more processors, cause the computer-hosted database system to:
receive a data retrieval instruction requesting retrieval of data stored in the first field but not data stored in the second field, wherein the data retrieval instruction requests retrieval at the column or attribute level supported by the rich data model; and
return, in response to the data retrieval instruction, the first transaction data stored in the first field and first cryptographic proof data sufficient to prove data originality of the first transaction data without knowledge of the second transaction data stored in the second field, wherein returning first cryptographic proof data comprises returning first cryptographic proof data at the column or attribute level supported by the rich data model.

17. The computer-hosted database system of claim 16, wherein the cryptographic proof data is stored in a Merkle hash tree.

18. The computer-hosted database system of claim 16, wherein the computer-hosted database system comprises an auditable change management system.

* * * * *